United States Patent
Yoshimori et al.

(10) Patent No.: US 11,191,021 B2
(45) Date of Patent: Nov. 30, 2021

(54) COMPUTER-READABLE MEDIUM, COMMUNICATION TERMINAL, AND METHOD FOR MAKING APPROPRIATE SELECTION BETWEEN PROMPTLY RECEIVING COMMUNICATION SIGNAL AND REDUCING POWER CONSUMPTION

(71) Applicant: BROTHER KOGYO KABUSHIKI KAISHA, Nagoya (JP)

(72) Inventors: Satoshi Yoshimori, Nagoya (JP); Takafumi Kai, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 54 days.

(21) Appl. No.: 16/554,702

(22) Filed: Aug. 29, 2019

(65) Prior Publication Data
US 2020/0084722 A1    Mar. 12, 2020

(30) Foreign Application Priority Data
Sep. 7, 2018    (JP) .............................. JP2018-167905

(51) Int. Cl.
*H04W 52/02*    (2009.01)
*G06F 1/3234*    (2019.01)
*H04W 4/80*    (2018.01)

(52) U.S. Cl.
CPC ...... *H04W 52/0235* (2013.01); *G06F 1/3234* (2013.01); *H04W 4/80* (2018.02); *H04W 52/0261* (2013.01)

(58) Field of Classification Search
CPC ... G06F 1/3234; H04W 4/80; H04W 52/0235; H04W 52/0261
See application file for complete search history.

(56) References Cited

U.S. PATENT DOCUMENTS 8,160,045 B1 * 4/2012 Chhabra ............... H04W 56/00
                                              370/342
8,295,216 B2 * 10/2012 Jokela ................. H04W 74/006
                                              370/311
(Continued)

FOREIGN PATENT DOCUMENTS

AT    383007 T  *  1/2008   ........ H04W 52/0216
AT    445989 T  * 10/2009   ........ H04W 52/0216
(Continued)

*Primary Examiner* — Eric Nowlin
(74) *Attorney, Agent, or Firm* — Scully Scott Murphy and Presser

(57) ABSTRACT

A non-transitory computer-readable medium stores an OS and an application configured to, when executed by a processor coupled with a communication terminal, cause the communication terminal to, when a first condition is satisfied, provide the OS with a first instruction to receive a communication signal from one or more communication devices at intervals of a first period, when a second condition different from the first condition is satisfied, provide the OS with a second instruction to receive the communication signal at intervals of a second period longer than the first period, and each time the OS, having received one of the first and second instructions, causes the communication terminal to receive the communication signal from one of the one or more communication devices in accordance with the received one of the first and second instructions, receive information of the one of the one or more communication devices.

10 Claims, 9 Drawing Sheets

(56) References Cited

U.S. PATENT DOCUMENTS

| | | | | |
|---|---|---|---|---|
| 8,619,652 | B2* | 12/2013 | Singh | H04N 21/43637 370/311 |
| 9,491,702 | B2* | 11/2016 | Dai | H04W 16/10 |
| 9,632,570 | B2* | 4/2017 | Hobbs | G06F 1/3296 |
| 2008/0130543 | A1* | 6/2008 | Singh | H04N 21/44227 370/311 |
| 2008/0151814 | A1* | 6/2008 | Jokela | H04W 74/006 370/328 |
| 2009/0325533 | A1* | 12/2009 | Lele | G06F 1/3209 455/343.1 |
| 2015/0131505 | A1* | 5/2015 | Dai | H04W 16/10 370/311 |
| 2015/0172906 | A1* | 6/2015 | Terazaki | H04W 52/0216 455/434 |
| 2016/0337966 | A1* | 11/2016 | Wieman | H04W 52/0219 |
| 2017/0026906 | A1* | 1/2017 | Neti | H04W 52/0258 |
| 2017/0201940 | A1* | 7/2017 | Honnappa | H04W 52/0232 |
| 2018/0049100 | A1* | 2/2018 | Tenny | H04W 40/244 |
| 2018/0220366 | A1* | 8/2018 | Bergstrom | H04W 76/28 |
| 2019/0258472 | A1* | 8/2019 | Kim | G06F 8/65 |
| 2020/0015100 | A1* | 1/2020 | Bilal | H04W 64/003 |
| 2020/0059861 | A1* | 2/2020 | Huang | H04W 52/0216 |
| 2020/0077336 | A1* | 3/2020 | Poy | H04W 52/0235 |
| 2020/0137688 | A1* | 4/2020 | Gulbay | H04W 4/00 |

FOREIGN PATENT DOCUMENTS

| | | | | | |
|---|---|---|---|---|---|
| CA | 2531395 | A1 | * | 7/2006 | H04L 12/12 |
| CA | 2531395 | C | * | 4/2012 | H04W 52/0216 |
| CN | 1809007 | A | * | 7/2006 | H04L 12/12 |
| CN | 1809007 | B | * | 6/2010 | H04W 52/0216 |
| CN | 108574981 | A | * | 9/2018 | |
| DE | 602005004112 | | * | 2/2008 | H04L 12/12 |
| DE | 602005004112 | T2 | * | 12/2008 | H04W 52/0216 |
| DE | 602005017201 | | * | 11/2009 | H04W 68/025 |
| EP | 1684465 | A1 | * | 7/2006 | H04L 12/12 |
| EP | 1684465 | B1 | * | 1/2008 | H04W 68/025 |
| EP | 1903720 | B1 | * | 10/2009 | H04W 68/025 |
| EP | 1903720 | B8 | * | 5/2010 | H04W 52/0216 |
| EP | 3593587 | A1 | * | 1/2020 | H04W 24/02 |
| JP | 2018-085773 | A | | 5/2018 | |
| WO | WO-2017019170 | A1 | * | 2/2017 | H04W 4/80 |
| WO | WO-2017119990 | A1 | * | 7/2017 | H04W 24/08 |
| WO | WO-2018156199 | A1 | * | 8/2018 | H04W 52/0235 |
| WO | WO-2018160823 | A1 | * | 9/2018 | H04L 43/10 |
| WO | WO-2018163070 | A1 | * | 9/2018 | H04W 8/005 |

* cited by examiner

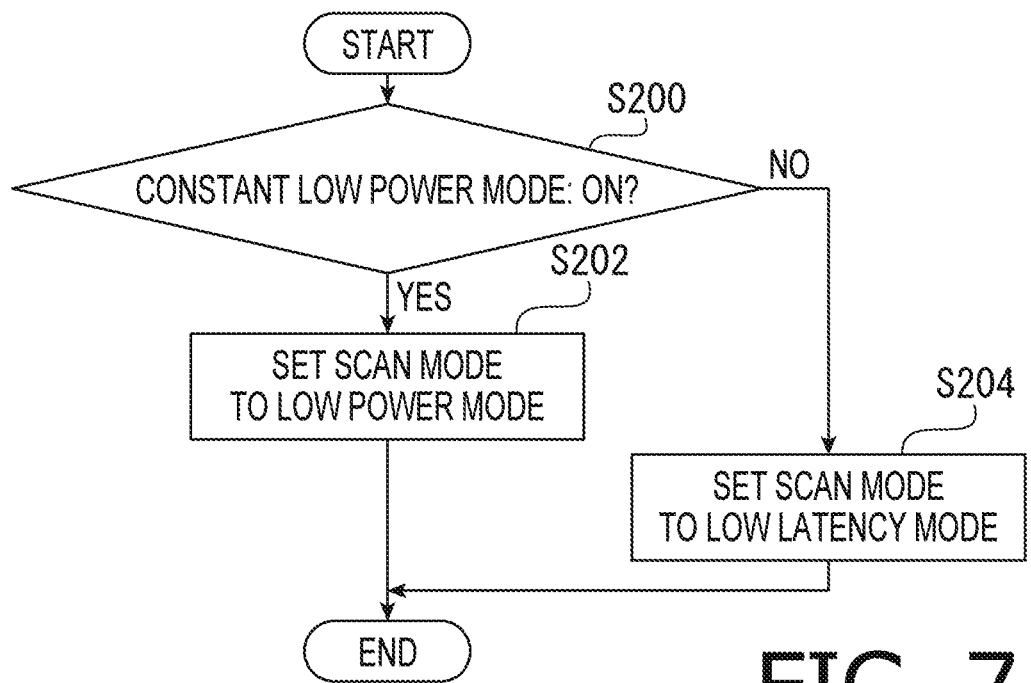

COMPUTER-READABLE MEDIUM, COMMUNICATION TERMINAL, AND METHOD FOR MAKING APPROPRIATE SELECTION BETWEEN PROMPTLY RECEIVING COMMUNICATION SIGNAL AND REDUCING POWER CONSUMPTION

CROSS-REFERENCE TO RELATED APPLICATION

This application claims priority under 35 U.S.C. § 119 from Japanese Patent Application No. 2018-167905 filed on Sep. 7, 2018. The entire subject matter of the application is incorporated herein by reference.

BACKGROUND

Technical Field

Aspects of the present disclosure are related to a non-transitory computer-readable medium, a communication terminal, and a method for making an appropriate selection between promptly receiving a communication signal and reducing power consumption.

Related Art

Heretofore, various wireless communication technologies have been proposed. As an example of the technologies, Bluetooth (registered trademark) Low Energy (hereinafter referred to as "BLE") has been known that enables a communication terminal to receive a communication signal from a communication device and perform wireless communication with the communication device by using the received communication signal.

SUMMARY

In the above-exemplified technology, the communication terminal may selectively perform one of a first process to receive the communication signal at intervals of a first period and a second process to receive the communication signal at intervals of a second period longer than the first period. Thus, in the first process, the communication terminal is more likely to promptly receive the communication signal. Further, in the second process, the communication terminal is allowed to reduce power consumption for receiving the communication signal.

Aspects of the present disclosure are advantageous to provide one or more improved techniques for a communication terminal to make an appropriate selection between promptly receiving a communication signal and reducing power consumption.

According to aspects of the present disclosure, a non-transitory computer-readable medium is provided, which stores computer-readable instructions that are executable by a processor coupled with a communication terminal. The communication terminal includes a communication interface and a display and stores an OS configured to, when executed by the processor, cause the communication terminal to perform a signal receiving process to receive a communication signal from one or more communication devices via the communication interface, each communication device being configured to periodically transmit the communication signal. The computer-readable instructions contain an application configured to, when executed in a foreground by the processor, cause the communication terminal to, when a first condition is satisfied, provide the OS with a first instruction to perform the signal receiving process in a first mode where the communication signal is received at intervals of a first period, when a second condition different from the first condition is satisfied, provide the OS with a second instruction to perform the signal receiving process in a second mode where the communication signal is received at intervals of a second period longer than the first period, each time the OS, having received one of the first instruction and the second instruction, causes the communication terminal to receive the communication signal from one of the one or more communication devices in the signal receiving process based on the received one of the first instruction and the second instruction, receive information of the one of the one or more communication devices, the information being contained in the received communication signal, and perform at least one of displaying, on the display, the one or more communication devices communicable by using the received information, and providing the OS with a communication instruction to perform communication with a specified one of the one or more communication devices by using a corresponding piece of the received information.

According to aspects of the present disclosure, further provided is a communication terminal including a communication interface, a display, a processor, and a memory. The memory stores an OS configured to, when executed by the processor, cause the communication terminal to perform a signal receiving process to receive a communication signal from one or more communication devices via the communication interface, each communication device being configured to periodically transmit the communication signal. The memory further stores computer-readable instructions containing an application configured to, when executed in a foreground by the processor, cause the communication terminal to, when a first condition is satisfied, provide the OS with a first instruction to perform the signal receiving process in a first mode where the communication signal is received at intervals of a first period, when a second condition different from the first condition is satisfied, provide the OS with a second instruction to perform the signal receiving process in a second mode where the communication signal is received at intervals of a second period longer than the first period, each time the OS, having received one of the first instruction and the second instruction, causes the communication terminal to receive the communication signal from one of the one or more communication devices in the signal receiving process based on the received one of the first instruction and the second instruction, receive information of the one of the one or more communication devices, the information being contained in the received communication signal, and perform at least one of displaying, on the display, the one or more communication devices communicable by using the received information, and providing the OS with a communication instruction to perform communication with a specified one of the one or more communication devices by using a corresponding piece of the received information.

According to aspects of the present disclosure, further provided is a method implementable on a processor coupled with a communication terminal including a communication interface, a display, and a memory. The memory stores an OS configured to, when executed by the processor, cause the communication terminal to perform a signal receiving process to receive a communication signal from one or more communication devices via the communication interface. The method includes when a first condition is satisfied, providing the OS with a first instruction to perform the signal receiving process in a first mode where the communication signal is received at intervals of a first period, when a second condition different from the first condition is satisfied, providing the OS with a second instruction to perform the signal receiving process in a second mode where the communication signal is received at intervals of a second period longer than the first period, each time the OS, having received one of the first instruction and the second instruction, causes the communication terminal to receive the communication signal from one of the one or more communication devices in the signal receiving process based on the received one of the first instruction and the second instruction, receiving information of the one of the one or more communication devices, the information being contained in the received communication signal, and performing at least one of displaying, on the display, the one or more communication devices communicable by using the received information, and providing the OS with a communication instruction to perform communication with a specified one of the one or more communication devices by using a corresponding piece of the received information.

BRIEF DESCRIPTION OF THE ACCOMPANYING DRAWINGS

FIG. 6 is a table used in a second illustrative embodiment according to one or more aspects of the present disclosure.

FIG. 7 is a flowchart showing a procedure of a process to be performed by a CPU of each mobile phone executing a corresponding application, in the second illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

<First Illustrative Embodiment>

Figure 1:
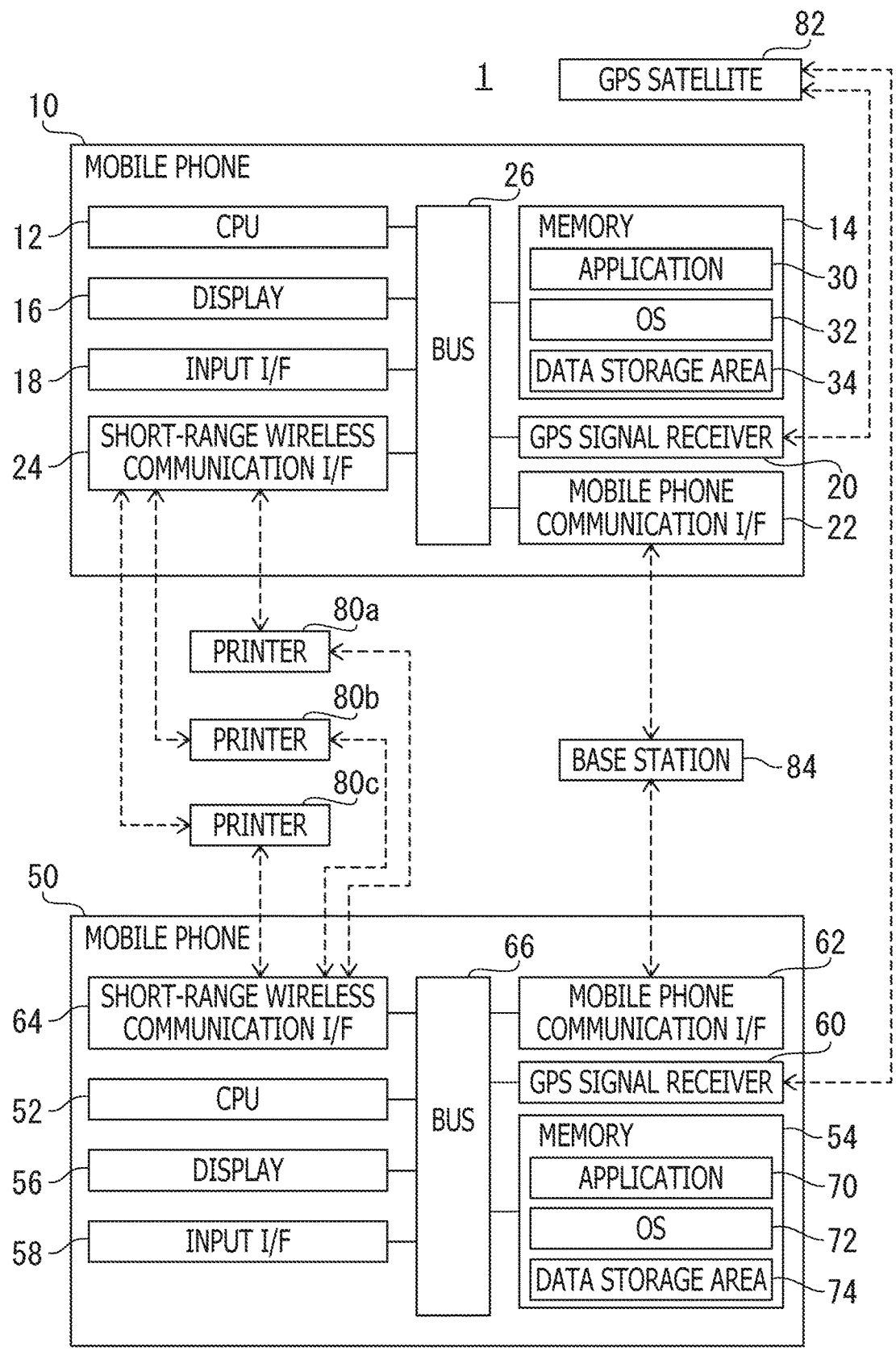
FIG. 1 is a block diagram schematically showing a configuration of a communication system including mobile phones and printers, in a first illustrative embodiment according to one or more aspects of the present disclosure.

Hereinafter, a first illustrative embodiment according to aspects of the present disclosure will be described with reference to FIGS. 1 to 5. FIG. 1 is a block diagram schematically showing a configuration of a communication system 1 of the first illustrative embodiment. As shown in FIG. 1, the communication system 1 includes mobile phones 10 and 50, and printers 80a, 80b, and 80c. The mobile phones 10 and 50 have substantially the same configuration. In the following description, the configuration of the mobile phone 10 will be set forth.

The mobile phone 10 includes a CPU 12, a memory 14, a display 16, an input I/F ("I/F" is an abbreviation of "interface") 18, a GPS signal receiver 20, a mobile phone communication I/F 22, and a short-range wireless communication I/F 24. These elements included in the mobile phone 10 are communicably interconnected via a bus 26.

The CPU 12 is configured to perform processing according to an application 30 and an OS 32 stored in the memory 14. The application 30 is a program for causing a printer 80 to perform image formation. The OS 32 is a program to provide basic functions usable by the application 30. In the first illustrative embodiment, for instance, one of Android (registered trademark) and iOS (registered trademark) may be employed as the OS 32. An OS 72 of the mobile phone 50 may be the same as the OS 32 of the mobile phone 10. Nonetheless, in the first illustrative embodiment, the OS 72 and the OS 32 are different from each other. Specifically, one of Android and iOS is used as the OS 32, while the other is used as the OS 72. Further, the mobile phone 10 and the mobile phone 50 are of respective different models. It is noted that, hereinafter, the CPU 12 executing a program such as the application 30 may be merely referred to as a name of the program. For instance, in the following descriptions, an expression "the application 30" may implicitly denote "the CPU 12 executing the application 30."

The memory 14 has a data storage area 34. The data storage area 34 is an area to store various types of data such as data necessary for execution of the application 30. The memory 14 may include at least one of storage devices such as a RAM, a ROM, a flash memory, an HDD, and a buffer for the CPU 12.

The memory 14 may include one or more non-transitory computer-readable storage media. Examples of the non-transitory computer-readable storage media may include, but are not limited to, a CD-ROM and a DVD-ROM besides the above-exemplified storage devices. The non-transitory computer-readable storage media are tangible media. Meanwhile, electric signals carrying programs downloaded from a server on the Internet may be classified as computer-readable signal media but are not included in the non-transitory computer-readable storage media.

The display 16 is configured to display various kinds of information for the mobile phone 10. The display 16 may be any type of display such as an LCD and an organic EL display as long as the display 16 is mountable on the mobile phone 10. The input I/F 18 may include keys for executing functions of the mobile phone 10. For instance, the input I/F 18 may include a touch panel integrated with the display 16. In this case, the input I/F 18 may be configured to accept a user operation to each icon displayed on the display 16. Additionally, or alternatively, the input I/F 18 may include hard keys.

The GPS signal receiver 20 is configured to receive a signal from a GPS satellite 82. Further, based on the received signal, the GPS signal receiver 20 may calculate a position of the mobile phone 10. Then, the application 30 may receive the calculated position of the mobile phone 10 from the OS 32.

The mobile phone communication I/F 22 is configured to perform wireless communication with a base station 84 in accordance with a mobile phone communication protocol. Hence, when brought into a state wirelessly communicable according to the mobile phone communication protocol, the mobile phone 10 may perform data communication via the base station 84.

The short-range wireless communication I/F 24 is configured to perform BLE communication based on IEEE 802.15.1 standard or other equivalent standards. It is noted that "BLE" is an abbreviation of "Bluetooth (registered trademark) Low Energy." Hence, when brought into a state wirelessly communicable in accordance with a BLE protocol, the mobile phone 10 may perform data communication with the printers 80.

The following descriptions mainly set forth processes by the CPU 12 in accordance with computer-readable program instructions. Namely, in the following descriptions, processes such as "judging," "determining," "extracting," "selecting," "specifying," "calculating," "obtaining," "acquiring," "accepting," "receiving," "transmitting," and "controlling" represent processes by the CPU 12. The processes by the CPU 12 may include hardware control via the OS 32. It is noted that "obtaining" or "acquiring" may be used as a concept that does not necessarily need a request. Namely, a process of the CPU 12 receiving data without making a request for the data may be contained in a concept "the CPU 12 obtains/acquires the data." Further, "data" to be referred to in the following descriptions may be expressed as a computer-readable bit string. Further, two or more pieces of data having substantially the same value but having respective different formats may be treated as the same data. The same applies to "information." Further, processes such as "instructing," "responding," and "requesting" may be performed by transmitting information representing an "instruction," a "response," and a "request." Further, processes such as "setting" and "configuring" may be performed by storing input setting information into a memory (e.g., the memory 14).

In the communication system 1 configured as above, the mobile phone 10 transmits print image data to a printer 80 via the BLE communication, and the printer 80 performs image formation based on the received print image data. Hereinafter, processes in the communication system 1 will be described.

First, via the BLE communication according to one of the short-range wireless communication standards, each printer 80 transmits a beacon signal referred to as an "advertising packet" at regular intervals of a particular period. The advertising packet is not transmitted to a specified device but is concurrently transmitted to a plurality of unspecified devices. Namely, the advertising packet is broadcasted.

The advertising packet includes a random address and a local name The random address is an address used for communication with a corresponding printer 80 that has transmitted the relevant advertising packet. The random address is periodically updated by the printer 80. Specifically, the random address is updated after a lapse of 15 minutes since disconnection of the BLE communication with the printer 80. Further, the local name is information for identifying the corresponding printer 80 that has transmitted the relevant advertising packet. Unlike the random address, the local name is not periodically updated. The local name may be any type of information as long as the local name can discriminate the corresponding printer 80 from the other printers 80. For instance, the local name may include at least one of, preferably both of, a model name and a serial number of the corresponding printer 80.

The OS 32 of the mobile phone 10 may receive the advertising packet from each printer 80. Nonetheless, it is noted that the OS 32 may not always receive the advertising packet but may receive the advertising packet only when the OS 32 is in a scan state where the OS 32 is allowed to receive the advertising packet. In this regard, the OS 32 may perform a scan process of receiving the advertising packet in the scan state, selectively in one of a low latency mode and a low power mode.

Specifically, in the low latency mode, the OS 32 is brought into the scan state at intervals of a very short period. In other words, in the low latency mode, the OS 32 alternately switches between the scan state and a non-scan state where the OS 32 is not allowed to receive the advertising packet, in a very short cycle. Therefore, in the low latency mode, the OS 32 is placed in the scan state for a long period of time in total per unit time. Namely, in the low latency mode, the OS 32 is allowed to receive the advertising packet substantially at any time as needed. Hence, it is possible to reduce a period of time required to receive the advertising packet. On the other hand, since the OS 32 is placed in the scan state for a long period of time in total per unit time, a large amount of electric power is consumed in the scan process.

In the low power mode, the OS 32 is brought into the scan state at intervals of a longer period than the period of the low latency mode. In other words, in the low power mode, the OS 32 alternately switches between the scan state and the non-scan state in a relatively longer cycle. More specifically, for instance, the OS 32 periodically and alternately repeats the scan state lasting for about 400 ms and the non-scan state lasting for about 4600 ms. Therefore, in the low power mode, the OS 32 is placed in the scan state for a shorter period of time in total per unit time. Namely, in the low power mode, the OS 32 is not allowed to receive the advertising packet substantially at any time as needed. Hence, in the low power mode, a longer period of time is required to receive the advertising packet. On the other hand, since the OS 32 is placed in the scan state for a shorter period of time in total per unit time, a smaller amount of electric power is consumed in the scan process.

Thus, the OS 32 may perform the scan process selectively in one of the low latency mode for shortening a period of time required to receive the advertising packet and the low power mode for reducing an amount of electric power consumed in the scan process. The OS 32 is caused to perform the scan process in a selected one of the low latency mode and the low power mode, by an instruction from the application 30. Namely, the application 30 provides the OS 32 with an instruction to perform the scan process in the low latency mode, in a situation where it is preferred to shorten the period of time required to receive the advertising packet. Meanwhile, the application 30 provides the OS 32 with an instruction to perform the scan process in the low power mode, in a situation where it is preferable to reduce the amount of electric power consumed in the scan process.

Figure 2:
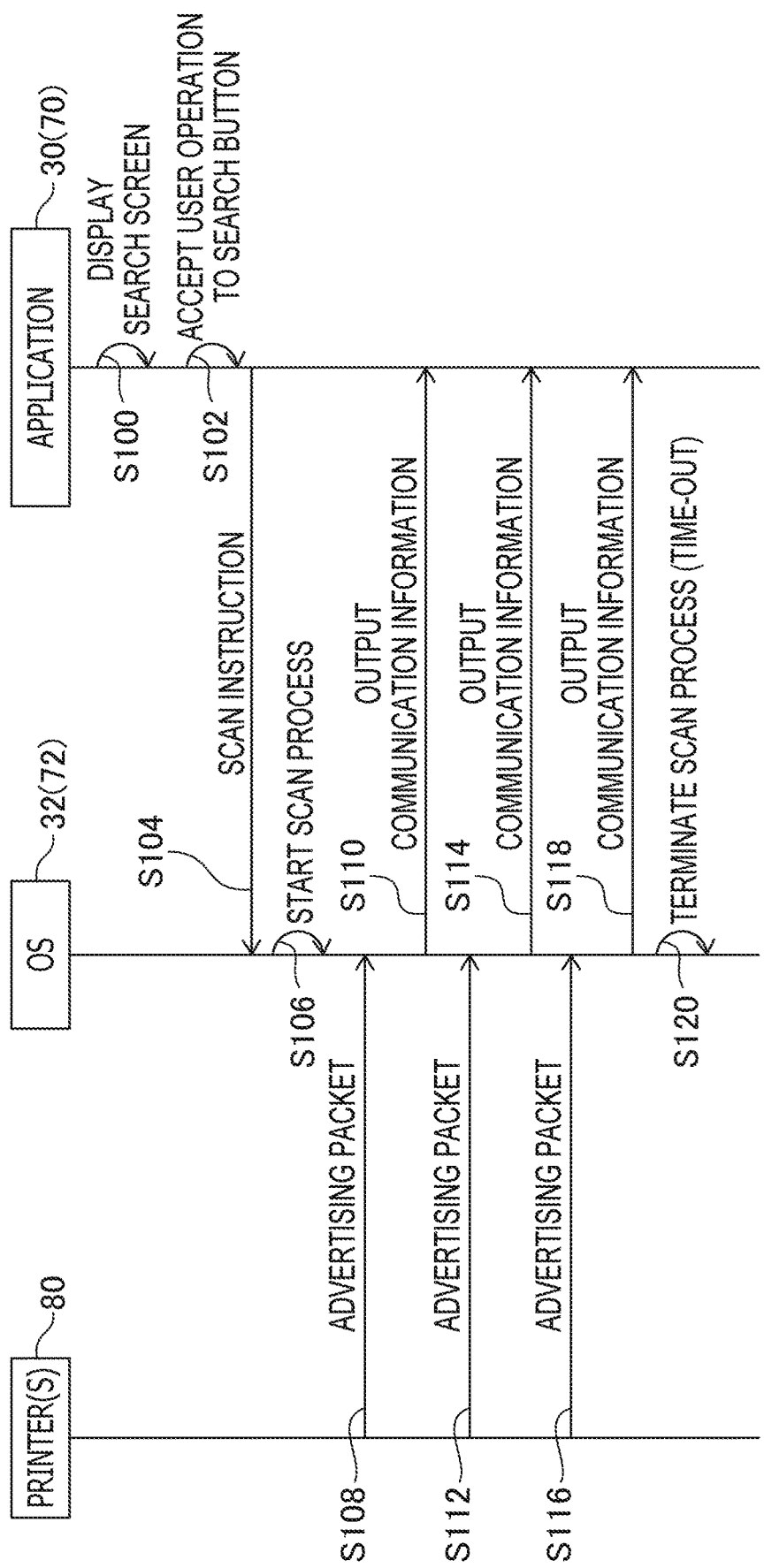
FIGS. 2 to 5 are sequence diagrams showing a sequence of processes in the communication system of the first illustrative embodiment according to one or more aspects of the present disclosure.

More specifically, in the mobile phone 10, when the application 30 is executed in the foreground, the application 30 causes the display 16 to display a search screen (not shown) for searching for one or more printers 80 communicable with the mobile phone 10 (S100 in FIG. 2). It is noted that the above expression "the application 30 is activated in the foreground" represents that the application 30 is in a user-operable state where the user is allowed to operate the application 30. On the search screen, a search button is displayed. When a search button, displayed on the search screen, is operated by the user, the application 30 accepts the user operation to the search button (S102). Then, the application 30 provides the OS 32 with a scan instruction to perform the scan process, thereby causing the OS 32 to search for one or more printers 80 communicable with the mobile phone 10 (S104). At this time, the application 30 outputs an instruction to perform the scan process in the low power mode. This is because, in a situation where the OS 32 needs to search for one or more printers 80 communicable with the mobile phone 10, reduction of power consumption is preferred rather than reduction of a period of time for searching the communicable printers 80.

Then, in response to receiving the instruction to perform the scan process in the low power mode, the OS 32 starts the scan process in the low power mode (S106). Thereby, the OS 32, in the scan state, receives an advertising packet from each printer 80 which is positioned within a communicable range of the BLE communication with the mobile phone 10 (S108). It is noted that hereinafter, the random address and the local name included in the advertising packet may be collectively referred to as "communication information." Subsequently, each time receiving an advertising packet from a printer 80, the OS 50 provides the application 30 with the received advertising packet (S110).

Specifically, for instance, in response to receiving an advertising packet from the printer 80a (S108), the OS 32 provides the application 30 with the received advertising packet (S110). Further, in response to receiving an advertising packet from the printer 80b (S112), the OS 32 provides the application 30 with the received advertising packet (S114). Likewise, in response to receiving an advertising packet from the printer 80c (S116), the OS 32 provides the application 30 with the received advertising packet (S118). Then, the OS 32 terminates the scan process in the low power mode in response to occurrence of time-out (S120). Specifically, the OS 32 measures an elapsed time from the start of the scan process in S106, and terminates the scan process at a timing at which the elapsed time becomes a setting time.

Figure 3:
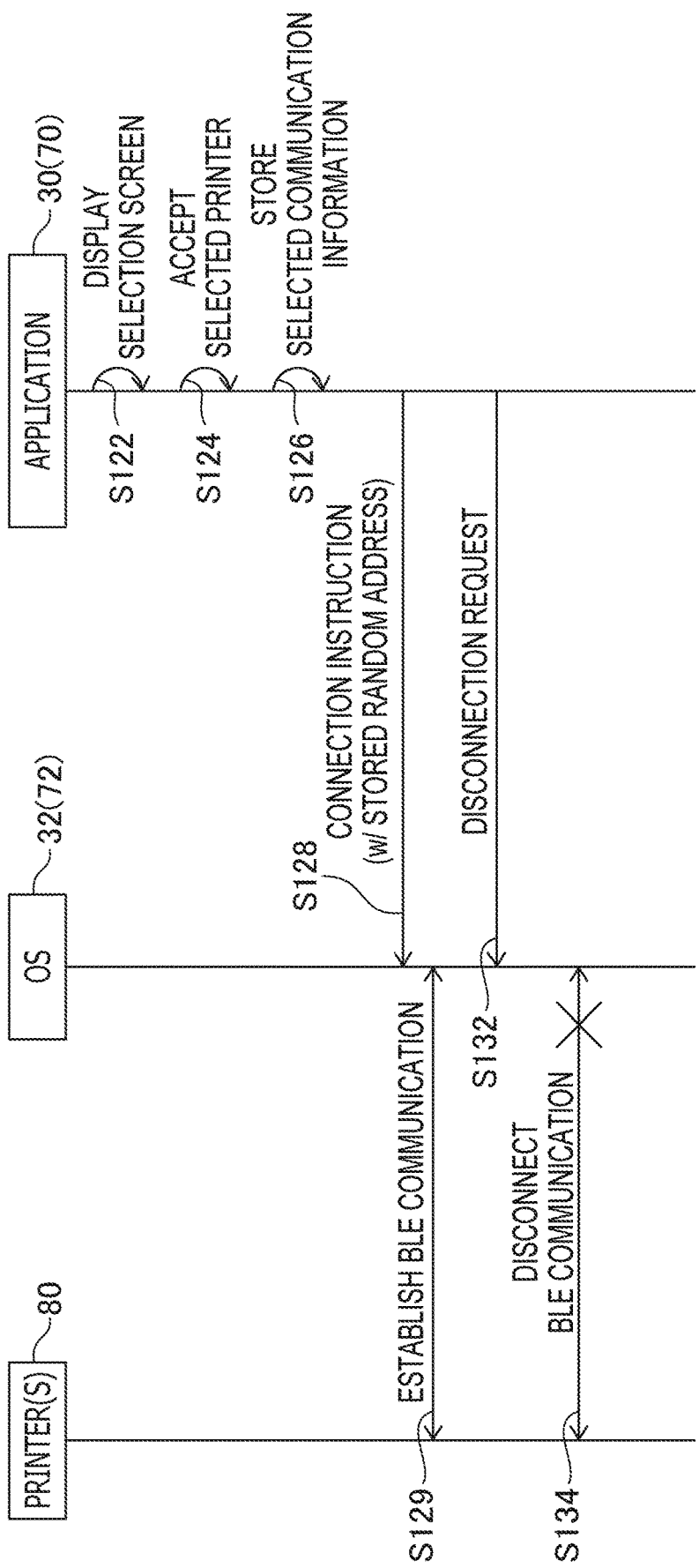
Figure 4:
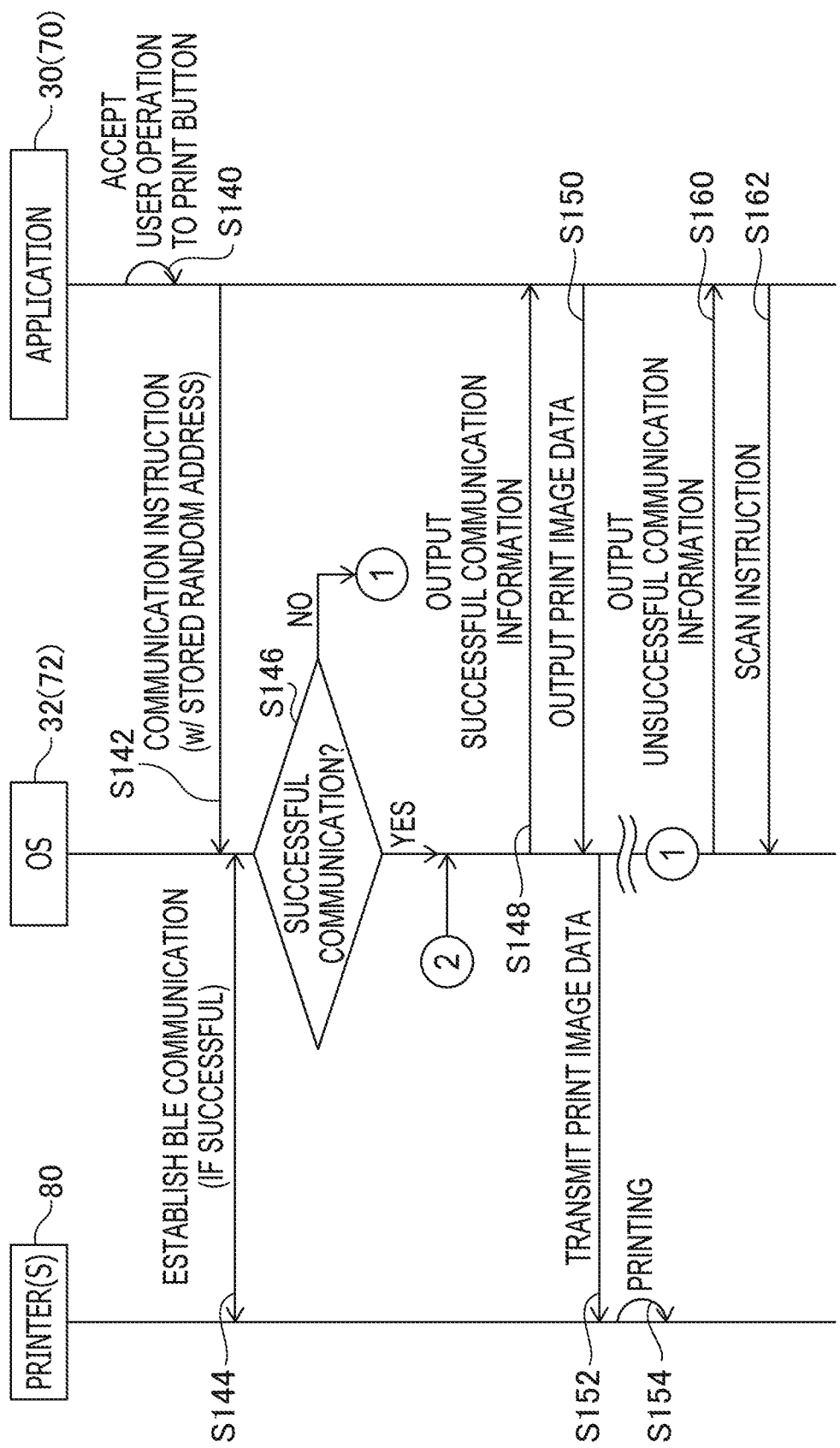

Further, the application 30, which has received communication information from the OS 32 (see S110, S114, and S118), causes the display 16 to display a selection screen (not shown) based on the received communication information (S122 in FIG. 3). On the selection screen, local names included in the communication information are displayed. Thus, an intended one of the printers 80 may be selected in response to a user operation to specify one of the local names displayed on the selection screen. More specifically, when the mobile phone 10 has received the advertising packets from the three printers 80a, 80b, and 80c, the respective local names associated with the three printers 80a, 80b, and 80c are displayed on the display 16. In this situation, an intended one of the three printers 80a, 80b, and 80c may be selected in response to a user operation to specify one of the three local names displayed on the selection screen. Thereby, the application 30 accepts the user operation to specify the intended printer (hereinafter referred to as the "selected printer").

Then, the application 30 stores, into the data storage area 34, the random address and the local name included in the communication information (hereinafter referred to as the "selected communication information") of the selected printer (S126). Afterward, the application 30 provides the OS 32 with a connection instruction to perform BLE communication with the selected printer by using the random address (hereinafter referred to as the "stored random address") stored in the data storage area 34 (S128). In response to receiving the connection instruction from the application 30, the OS 32 transmits a connection request with the stored random address to the selected printer, thereby establishing BLE communication with the selected printer (S129). Further, after a lapse of a particular period of time since establishment of the BLE communication with the selected printer, the application 30 provides the OS 32 with a disconnection request (S132). Thereby, the OS 32 disconnects the BLE communication with the selected printer (S134).

As described above, the application 30 is a program for causing a printer 80 to perform image formation. Specifically, for instance, the application 30 may cause the display 16 to display a printing execution screen (not shown) for causing a printer 80 to perform image formation. Further, the printing execution screen may include a print button displayed thereon. The print button may be configured to, when operated, cause a printer to start image formation. In response to accepting a user operation to the print button (S140 in FIG. 4), the application 30 provides the OS 32 with a communication instruction to perform BLE communication with the selected printer by using the stored random address stored in S126, i.e., by using the random address of the selected printer (S142).

In response to receiving the communication instruction, the OS 32 attempts to establish BLE communication with the selected printer by using the stored random address. When the attempt is successful, BLE communication is established between the OS 32 and the selected printer (S144). Then, when determining that the OS 32 has succeeded in establishing the BLE communication with the selected printer by using the stored random address (S146: Yes), the OS 2 provides the application 30 with successful communication information representing the successful attempt to establish BLE communication with the selected printer (S148).

Subsequently, in response to receiving the successful communication information from the OS 32, the application 30 provides the OS 32 with print image data (S150). In response to receiving the print image data, the OS 32 transmits the received print image data along with a print instruction, to the selected printer via the BLE communication (S152). Thereby, the selected printer performs a printing process to form an image based on the print image data received from the mobile phone 10 (S154).

In the attempt to establish BLE communication with the selected printer by using the stored random address in accordance with the communication instruction received from the application 30 in S142, the OS 32 may fail to establish BLE communication with the selected printer. This is because the selected printer periodically updates its random address after disconnection of the BLE communication in S134. Specifically, when receiving, from the selected printer, the advertising packet including a random address RA1 and a local name LN1 in one of the steps S108, S112, and S116, the OS 32 stores, into the data storage area 34, the random address RA1 and the local name LN1 as the selected communication information. Then, after disconnection of the BLE communication in S134, the application 30 provides the OS 32 with the communication instruction to perform BLE communication with the selected printer by using the random address RA1 stored in the data storage area 34, in S142. In response to receiving the communication instruction, the OS 32 attempts to establish BLE communication with the selected printer by using the random address RA1 in S144.

However, since the selected printer periodically updates its random address, the random address RA1 may be updated to a random address RA2. In such a case, the OS 32 fails to establish BLE communication with the selected printer by using the stored random address RA1 (S146: No). It is noted that when the attempt in S144 is unsuccessful, BLE communication is not established between the OS 32 and the selected printer.

When determining that the OS 32 has failed to establish the BLE communication with the selected printer by using the stored random address (S146: No), the OS 32 provides the application 30 with unsuccessful communication information representing the unsuccessful attempt to establish the BLE communication with the selected printer (S160). In response to receiving the unsuccessful communication information from the OS 32, the application 30 provides the OS 32 with a scan instruction to perform the scan process, so as to again receive communication information from the selected printer (S162). At this time, the application 30 provides the OS 32 with the scan instruction to perform the scan process in the low latency mode. This is because, in such a situation that the print button is operated after the selected printer has been specified, promptly establishing BLE communication with the selected printer is preferred rather than reducing the amount of electric power consumed in the scan process.

Figure 5:
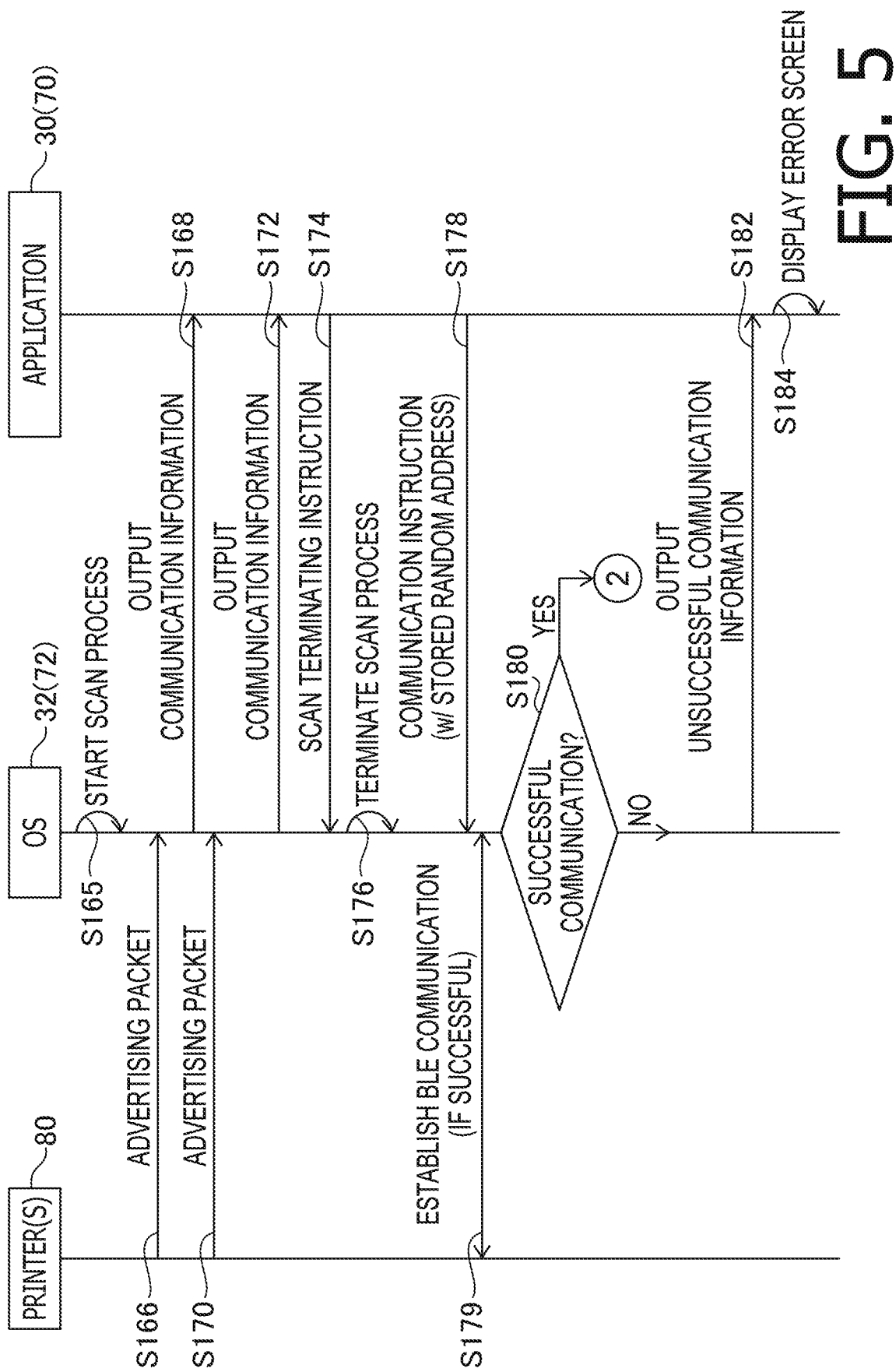

Then, in response to receiving the scan instruction to perform the scan process in the low latency mode, the OS 32 starts the scan process in the low latency mode (S165 in FIG. 5). Hence, the OS 32, which has been brought into the scan state, receives an advertising packet from each printer 80 positioned within the communicable range of the BLE communication with the mobile phone 10 (S166). Then, each time receiving an advertising packet from a printer 80, the OS 32 provides the application 30 with the communication information included in the received advertising packet (S168). The scan process in the low power mode has been terminated due to occurrence of time-out (see S120). Meanwhile, the scan process in the low latency mode is terminated in response to receipt of an advertising packet from the selected printer.

Specifically, for instance, in response to receiving an advertising packet from a printer 80 different from the selected printer (S166), the OS 32 provides the application 30 with communication information included in the received advertising packet (S168). At this time, the application 30 determines whether a local name included in the received communication information is identical to the local name stored in the data storage area 34. Since the received communication information is of the printer 80 different from the selected printer, the local name included in the received communication information is different from the local name stored in the data storage area 34. In this case, the scan process is not terminated but is continuously performed.

Subsequently, in response to receiving an advertising packet from the selected printer (S170), the OS 32 provides the application 30 with communication information included in the received advertising packet (S172). At this time, the application 30 determines whether a local name included in the received communication information is identical to the local name stored in the data storage area 34. Since the received communication information is of the selected printer, the local name included in the received communication information is identical to the local name stored in the data storage area 34. Therefore, the application 30 stores the random address included in the received communication information into the data storage area 34. Further, the application provides the OS 32 with a scan terminating instruction to terminate the scan process (S174). In response to receiving the scan terminating instruction, the OS 32 terminates the scan process (S176).

Further, the application 30 provides the OS 32 with a communication instruction to perform BLE communication with the selected printer by using the random address (hereinafter referred to as the "updated random address") included in the communication information, received in S172, of the selected printer (S178). In response to receiving the communication information from the application 30, the OS 32 attempts to perform BLE communication with the selected printer by using the updated random address. At this time, when the attempt is successful, BLE communication is established between the OS 32 and the selected printer (S179). Then, when determining that the OS 32 has succeeded in the BLE communication with the selected printer by using the updated random address (S180: Yes), the communication system 1 performs the steps S148 to S154 (see FIG. 4).

Meanwhile, when determining that the OS 32 has failed to establish the BLE communication with the selected printer by using the updated random address (S180: No), the OS 32 provides the application 30 with the unsuccessful communication information representing the unsuccessful attempt to establish the BLE communication with the selected printer (S182). In response to receiving the unsuccessful communication information, the application 30 causes the display 16 to display an error screen (not shown) (S184).

Thus, when the mobile phone 10 is searching for one or more printers 80 communicable therewith in response to acceptance of a user operation to the search button (i.e., in a situation where it is preferable to reduce the amount of electric power consumed in the scan process), the application 30 provides the OS 32 with a scan instruction to perform the scan process in the low power mode. Meanwhile, when the mobile phone 10 needs to cause the selected printer to perform printing in response to acceptance of a user operation to the print button (i.e., in a situation where it is preferable to shorten a period of time required for receiving an advertising packet so as to promptly establish BLE communication with the selected printer), the application 30 provides the OS 32 with a scan instruction to perform the scan process in the low latency mode. Thus, it is possible for each mobile phone 10 and 50 to make an appropriate selection between reducing power consumption and promptly establishing BLE communication, depending on the individual situation.

<Second Illustrative Embodiment>

In the communication system 1 of the aforementioned first illustrative embodiment, in the situation where the mobile phone 10 is searching for one or more printers 80 communicable therewith, the application 30 provides the OS 32 with a scan instruction to perform the scan process in the low power mode. Meanwhile, in the situation where the mobile phone 10 is required to cause the selected printer to perform printing, the application 30 provides the OS 32 with a scan instruction to perform the scan process in the low latency mode. In a communication system 1 of a second illustrative embodiment, each of the mobile phones 10 and 50 may be configured such that the corresponding application 30 or 70 selectively provides one of a scan instruction to perform the scan process in the low power mode and a scan instruction to perform the scan process in the low latency mode, to the corresponding OS 32 or 72 depending on a model of each mobile phone 10 and 50.

Specifically, in the second illustrative embodiment, the mobile phone 10 is of a model configured to easily receive an advertising packet in the scan process in the low power mode. Meanwhile, the mobile phone 50 is of a model configured to receive an advertising packet with difficulty in the scan process in the low power mode. In other words, the mobile phone 10 is configured to take a relatively shorter period of time to receive an advertising packet in the scan process in the low power mode. Meanwhile, the mobile phone 50 is configured to take a relatively longer period of time to receive an advertising packet in the scan process in the low power mode.

In view of the above configurations of the mobile phones 10 and 50, a table as shown in FIG. 6 is stored in the respective data storage areas 34 and 74 of the mobile phones 10 and 50. On the table, mode specifying information is set only for the model of the mobile phone 10 but not for the model of the mobile phone 50. The mode specifying information represents that the scan process needs to be performed not in the low latency mode but in the low power mode. Specifically, in the example shown in FIG. 6, an "constant low power mode" is set ON only for the model of the mobile phone 10 but not for the model of the mobile phone 50.

Therefore, the application 30 of the mobile phone 10 obtains, from the OS 32, information representing the model of the mobile phone 10 at particular timing by using an API ("API" is an abbreviation of "Application Programming Interface"). Then, the application 30, after activated, refers to the table stored in the data storage area 34 and determines whether the mode specifying information is set for the model of the mobile phone 10 represented by the information obtained from the OS 32 (S200 in FIG. 7). At this time, the application 30 determines that the mode specifying information is set for the model of the mobile phone 10 (S200: Yes). Therefore, the application 30 sets the scan mode for the mobile phone 10 to the low power mode (S202). Meanwhile, the application 70 of the mobile phone 50 also obtains, from the OS 72, information representing the model of the mobile phone 50 at particular timing by using an API. Then, the application 70, after activated, refers to the table stored in the data storage area 74 and determines whether the mode specifying information is set for the model of the mobile phone 70 represented by the information obtained from the OS 32 (S200). At this time, the application 70 determines that the mode specifying information is not set for the model of the mobile phone 50 (S200: No). Therefore, the application 70 sets the scan mode for the mobile phone 50 to the low latency mode (S204).

Then, after one of the low power mode and the low latency mode is set as the scan mode for a mobile phone 10 or 50, a corresponding application 30 or 70 provides a corresponding OS 32 or 72 with a scan instruction to perform the scan process in the set scan mode. Specifically, in the mobile phone 10, after acceptance of a user operation to the search button (S102 in FIG. 2), or after receipt of the unsuccessful communication information output from the OS 32 in response to an unsuccessful attempt to establish the BLE communication with the selected printer after the print button has been operated (S160 in FIG. 4), the application 30 provides the OS 32 with a scan instruction to perform the scan process in the low power mode (S104 in FIG. 2, or S162 in FIG. 4). Further, in the mobile phone 50, after acceptance of a user operation to the search button (S102 in FIG. 2), or after receipt of the unsuccessful communication information output from the OS 72 in response to an unsuccessful attempt to establish BLE communication with a selected printer after the print button has been operated (S160 in FIG. 4), the application 70 provides the OS 72 with a scan instruction to perform the scan process in the low latency mode (S104 in FIG. 2, or S162 in FIG. 4). Thus, in the mobile phone 10 which needs a relatively shorter period of time to receive an advertising packet in the scan process in the low power mode, the scan process is performed in the low power mode. Meanwhile, in the mobile phone 50 which needs a relatively longer period of time to receive an advertising packet in the scan process in the low power mode, the scan process is performed in the low latency mode. Thus, it is possible for each mobile phone 10 and 50 to make an appropriate selection between reducing power consumption and promptly establishing BLE communication, depending on the individual model of each mobile phone 10 and 50.

Further, in the communication system 1 of the second illustrative embodiment, each printer 80 may be configured to change a transmission interval for regularly transmitting an advertising packet, depending on the set scan mode. Specifically, for instance, each printer 80 may be configured to regularly transmit an advertising packet, selectively in one of a short period mode and a long period mode. The short period mode is a mode where an advertising packet is transmitted at regular intervals of a relatively shorter period of time. The long period mode is a mode where an advertising packet is transmitted at regular intervals of a relatively longer period of time.

Accordingly, when the scan mode set for a mobile phone 10 or 50 is a mode where the mobile phone 10 or 50 is brought into the scan state at intervals of a relatively shorter period of time, the corresponding application 30 or 70 may transmit an instruction to transmit an advertising packet in the short period mode, as a transmission interval specifying instruction, to the corresponding printer 80 via the corresponding OS 32 or 72. It is noted that the transmission interval specifying instruction is for specifying the transmission interval for regularly transmitting an advertising packet. Further, when the scan mode set for a mobile phone 10 or 50 is a mode where the mobile phone 10 or 50 is brought into the scan state at intervals of a relatively longer period of time, the corresponding application 30 or 70 may transmit an instruction to transmit an advertising packet in the long period mode, as the transmission interval specifying instruction, to the corresponding printer 80 via the corresponding OS 32 or 72.

Figure 8:
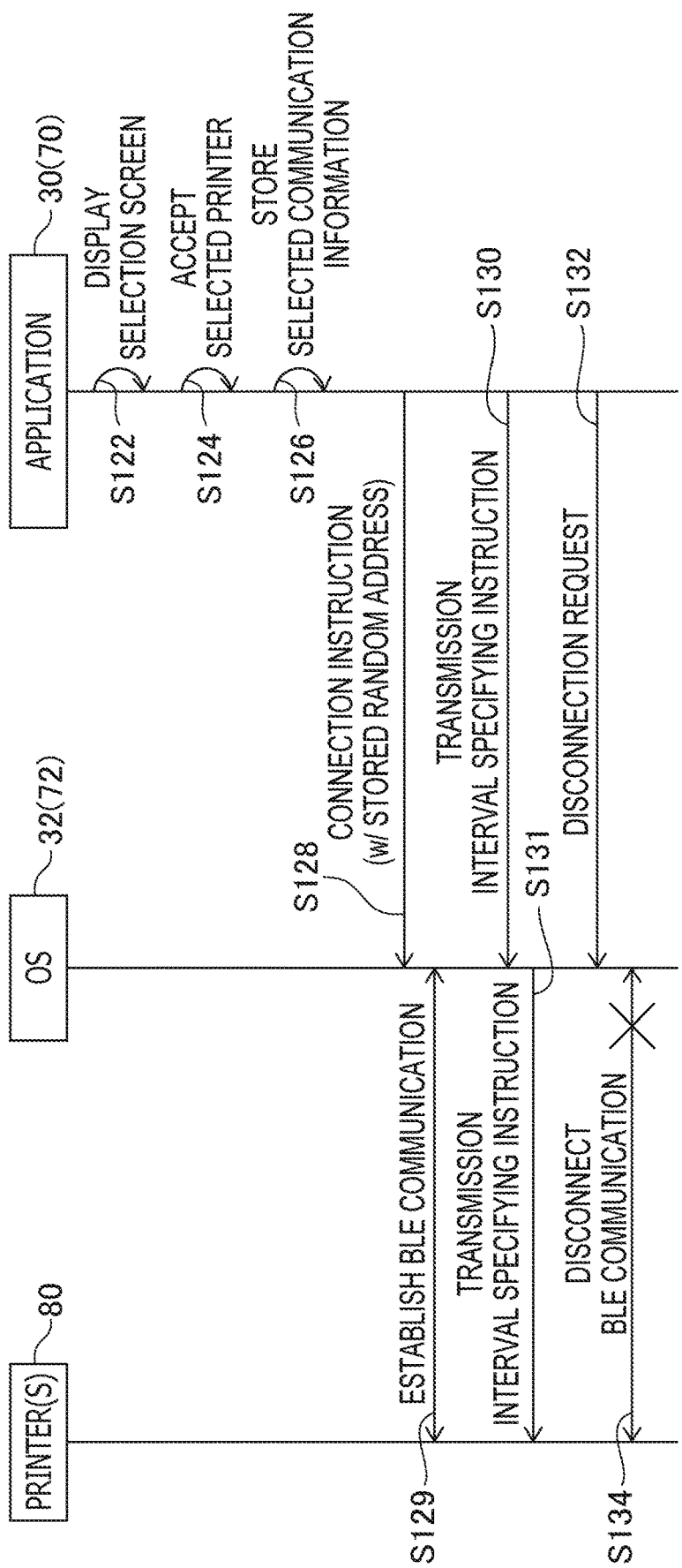
FIG. 8 is a sequence diagram showing a sequence of processes in a communication system of the second illustrative embodiment according to one or more aspects of the present disclosure.

Specifically, in the mobile phone 10, the low power mode is set as the scan mode for the mobile phone 10. Hence, as shown in FIG. 8, the application 30 provides the OS 32 with a connection instruction to perform BLE communication with a selected printer by using stored random address (S128). Thereafter, the OS 32 establishes BLE communication with the selected printer by using the stored random address (S129). Further, the application 30 provides the OS 32 with an instruction to transmit an advertising packet in the long period mode as the transmission interval specifying instruction (S130). Then, the OS 32 transmits the transmission interval specifying instruction to transmit an advertising packet in the long period mode, to the selected printer via the BLE communication established in S129 (S131).

In response to receiving the transmission interval specifying instruction, the selected printer regularly transmits an advertising packet in the long period mode. Thus, it is possible to reduce an amount of electric power consumed by the selected printer. It is noted that the sequence diagram shown in FIG. 8 is substantially the same as the above-explained sequence diagram shown in FIG. 3 except for the steps S129 and S131.

Further, in the mobile phone 50, the low latency mode is set as the scan mode for the mobile phone 15. Hence, the application 70 provides the OS 72 with a connection instruction to perform BLE communication with a selected printer by using stored random address (S128). Thereafter, the OS 72 establishes BLE communication with the selected printer by using the stored random address (S129). In addition, the application 70 provides the OS 72 with an instruction to transmit an advertising packet in the short period mode as the transmission interval specifying instruction (S130). Then, the OS 72 transmits the transmission interval specifying instruction to transmit an advertising packet in the short period mode, to the selected printer via the BLE communication established in S129 (S131). In response to receiving the transmission interval specifying instruction, the selected printer regularly transmits an advertising packet in the short period mode. Thereby, the mobile phone 50 is allowed to easily receive the advertising packet from the selected printer.

<Third Illustrative Embodiment>

In a communication system 1 of a third illustrative embodiment, each of the mobile phones 10 and 50 may be configured such that the corresponding application 30 or 70 selectively provides one of a scan instruction to perform the scan process in the low power mode and a scan instruction to perform the scan process in the low latency mode, to the corresponding OS 32 or 72 depending on an amount of battery charge remaining in each mobile phone 10 and 50. It is noted that although the following description will be directed to the mobile phone 10, the same may apply to the mobile phone 50.

Figure 9:
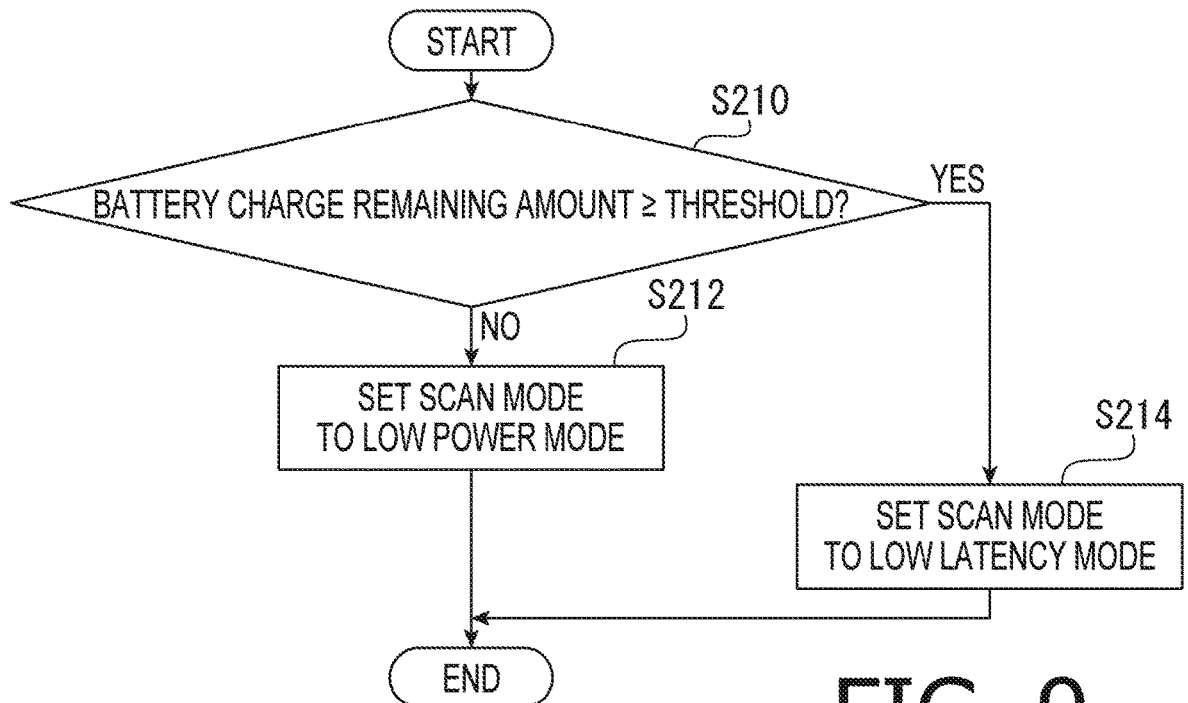
FIG. 9 is a flowchart showing a procedure of a process to be performed by a CPU of each mobile phone executing a corresponding application, in a third illustrative embodiment according to one or more aspects of the present disclosure.

Specifically, when a relatively larger amount of battery charge remains in the mobile phone 10, there is less need to reduce an amount of electric power consumed by the mobile phone 10. In contrast, when a relatively smaller amount of battery charge remains in the mobile phone 10, there is more need to reduce the amount of electric power consumed by the mobile phone 10. Therefore, the application 30 determines whether the battery charge remaining amount is equal to or more than a threshold, at a particular timing (S210 in FIG. 9). When determining that the battery charge remaining amount is less than the threshold (S210: No), the application 30 sets the scan mode for the mobile phone 10 to the low power mode (S212). Meanwhile, when determining that the battery charge remaining amount is equal to or more than the threshold (S210: Yes), the application 30 sets the scan mode for the mobile phone 10 to the low latency mode (S214).

Then, the application 30 provides the OS 32 with a scan instruction to perform the scan process in the set scan mode. Specifically, when the battery charge remaining amount is less than the threshold, after acceptance of a user operation to the search button (S102 in FIG. 2), or after receipt of the unsuccessful communication information output from the OS 32 in response to an unsuccessful attempt to establish the BLE communication with the selected printer after the print button has been operated (S160 in FIG. 4), the application 30 provides the OS 32 with a scan instruction to perform the scan process in the low power mode (S104 in FIG. 2, or S162 in FIG. 4). Thus, when a relatively smaller amount of battery charge remains in the mobile phone 10, it is possible to reduce the amount of electric power consumed by the mobile phone 10. Meanwhile, when the battery charge remaining amount is equal to or more than the threshold, after acceptance of a user operation to the search button (S102 in FIG. 2), or after receipt of the unsuccessful communication information output from the OS 32 in response to an unsuccessful attempt to establish the BLE communication with the selected printer after the print button has been operated (S160 in FIG. 4), the application 30 provides the OS 32 with a scan instruction to perform the scan process in the low latency mode (S104 in FIG. 2, or S162 in FIG. 4). Thus, when a relatively larger amount of battery charge remains in the mobile phone 10, it is possible to promptly establish the BLE communication with the selected printer, without having to reduce the amount of electric power consumed by the mobile phone 10.

<Fourth Illustrative Embodiment>

In a communication system 1 of a fourth illustrative embodiment, each of the mobile phones 10 and 50 may be configured such that the corresponding application 30 or 70 selectively provides one of a scan instruction to perform the scan process in the low power mode and a scan instruction to perform the scan process in the low latency mode, to the corresponding OS 32 or 72 depending on whether each mobile phone 10 and 50 is being charged. It is noted that although the following description will be directed to the mobile phone 10, the same may apply to the mobile phone 50.

Figure 10:
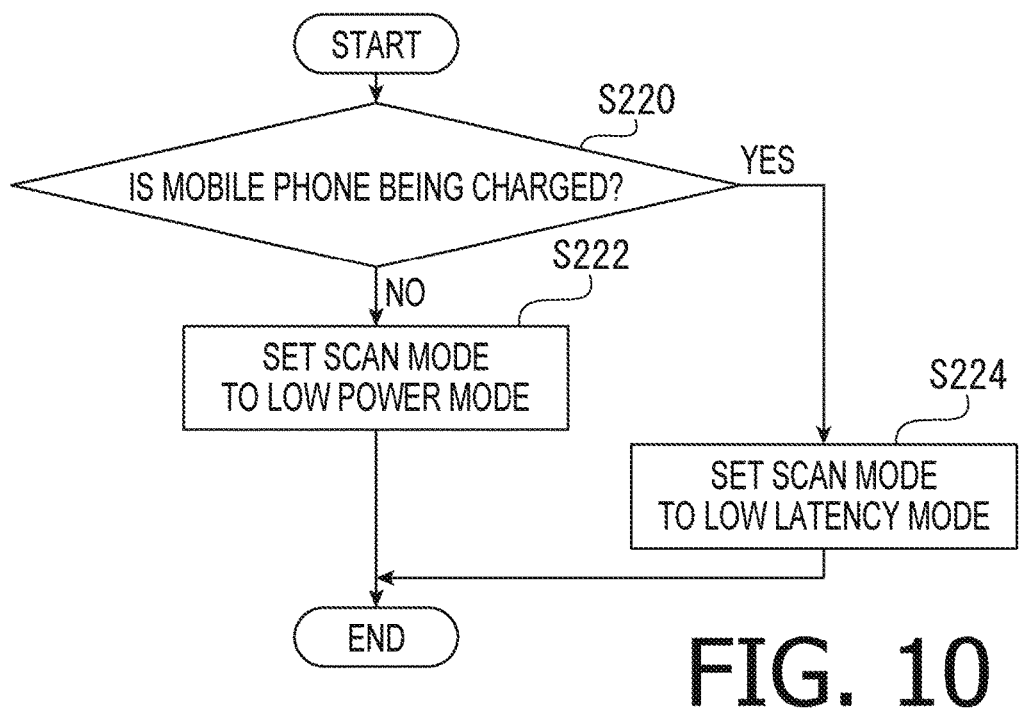
FIG. 10 is a flowchart showing a procedure of a process to be performed by a CPU of each mobile phone executing a corresponding application, in a fourth illustrative embodiment according to one or more aspects of the present disclosure.

Specifically, when the mobile phone 10 is being charged, there is less need to reduce the amount of electric power consumed by the mobile phone 10. In contrast, when the mobile phone 10 is not being charged, there is more need to reduce the amount of electric power consumed by the mobile phone 10. Therefore, the application 30 determines whether the mobile phone 10 is being charged, at a particular timing (S220 in FIG. 10). When determining that the mobile phone 10 is not being charged (S220: No), the application 30 sets the scan mode for the mobile phone 10 to the low power mode (S222). Meanwhile, when determining that the mobile phone 10 is being charged (S220: Yes), the application 30 sets the scan mode for the mobile phone 10 to the low latency mode (S224).

Then, the application 30 provides the OS 32 with a scan instruction to perform the scan process in the set scan mode. Specifically, when the mobile phone 10 is not being charged, after acceptance of a user operation to the search button (S102 in FIG. 2), or after receipt of the unsuccessful communication information output from the OS 32 in response to an unsuccessful attempt to establish the BLE communication with the selected printer after the print button has been operated (S160 in FIG. 4), the application 30 provides the OS 32 with a scan instruction to perform the scan process in the low power mode (S104 in FIG. 2, or S162 in FIG. 4). Meanwhile, when the mobile phone 10 is being charged, after acceptance of a user operation to the search button (S102 in FIG. 2), or after receipt of the unsuccessful communication information output from the OS 32 in response to an unsuccessful attempt to establish the BLE communication with the selected printer after the print button has been operated (S160 in FIG. 4), the application 30 provides the OS 32 with a scan instruction to perform the scan process in the low latency mode (S104 in FIG. 2, or S162 in FIG. 4). Thus, it is possible for each mobile phone 10 and 50 to make an appropriate selection between reducing power consumption and promptly establishing BLE communication, based on the individual state as to whether each mobile phone 10 and 50 is being charged.

<Fifth Illustrative Embodiment>

In a communication system 1 of a fifth illustrative embodiment, each of the mobile phones 10 and 50 may be configured such that the corresponding application 30 or 70 selectively provides one of a scan instruction to perform the scan process in the low power mode and a scan instruction to perform the scan process in the low latency mode, to the corresponding OS 32 or 72 depending on where each mobile phone 10 and 50 is. It is noted that although the following description will be directed to the mobile phone 10, the same may apply to the mobile phone 50.

Figure 11:
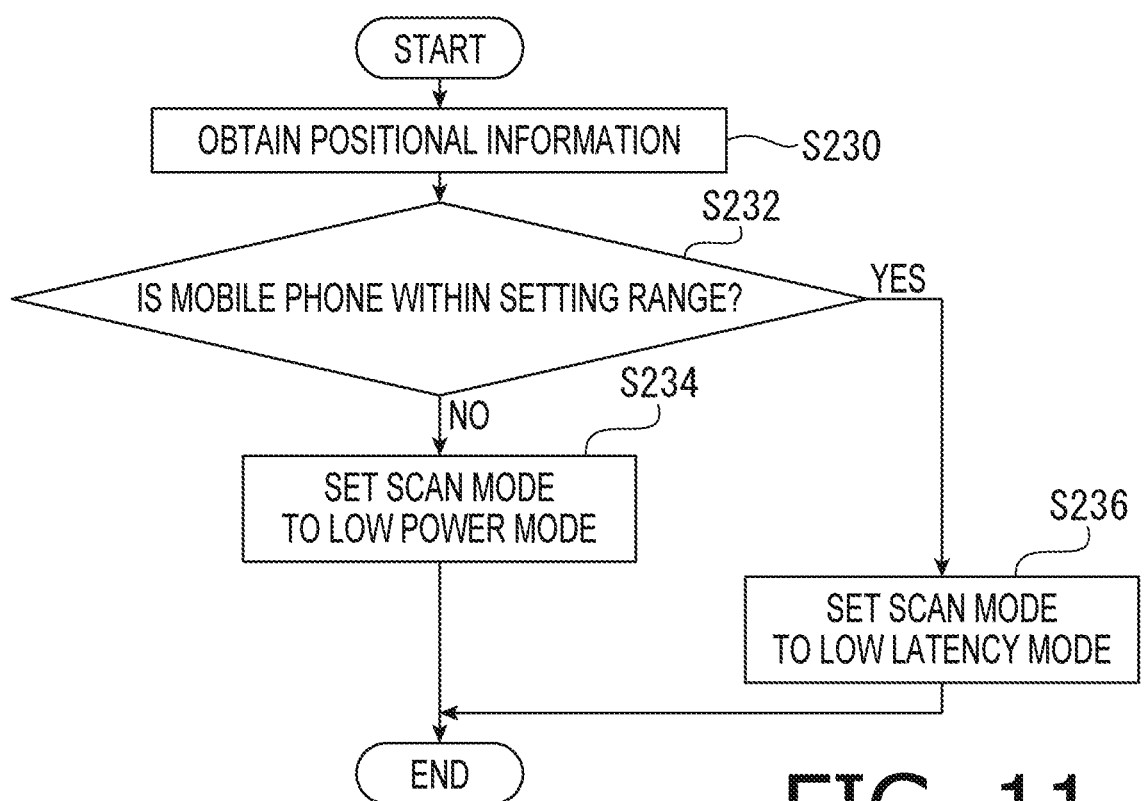
FIG. 11 is a flowchart showing a procedure of a process to be performed by a CPU of each mobile phone executing a corresponding application, in a fifth illustrative embodiment according to one or more aspects of the present disclosure.

Specifically, for instance, when the user of the mobile phone 10 is meeting with a customer out of the user's office, it is preferable to shorten a period of time required for printing. In contrast, when the user of the mobile phone 10 is in the user's office, there is less need to shorten the period of time required for printing. Therefore, the application 30 obtains, from the OS 32, positional information representing a position of the mobile phone 10 at a particular timing (S230 in FIG. 11). It is noted that, as described above, the OS 32 receives the GPS signal from the GPS signal receiver 20 and calculates the positional information based on the received GPS signal. Then, the application 30 determines whether the mobile phone 10 is positioned within a setting range, based on the obtained positional information (S232). In the fifth illustrative embodiment, the setting range is set to a range excluding the user's office.

When determining that the mobile phone 10 is not positioned within the setting range (i.e., when the user of the mobile phone 10 is in the user's office) (S232: No), the application 30 sets the scan mode for the mobile phone 10 to the low power mode (S234). Meanwhile, when determining that the mobile phone 10 is positioned within the setting range (i.e., when the user of the mobile phone 10 is out of the user's office) (S232: Yes), the application 30 sets the scan mode for the mobile phone 10 to the low latency mode (S236).

Then, the application 30 provides the OS 32 with a scan instruction to perform the scan process in the set scan mode. Specifically, when the user of the mobile phone 10 is in the user's office, after acceptance of a user operation to the search button (S102 in FIG. 2), or after receipt of the unsuccessful communication information output from the OS 32 in response to an unsuccessful attempt to establish the BLE communication with the selected printer after the print button has been operated (S160 in FIG. 4), the application 30 provides the OS 32 with a scan instruction to perform the scan process in the low power mode (S104 in FIG. 2, or S162 in FIG. 4). Meanwhile, when the user of the mobile phone 10 is out of the user's office, after acceptance of a user operation to the search button (S102 in FIG. 2), or after receipt of the unsuccessful communication information output from the OS 32 in response to an unsuccessful attempt to establish the BLE communication with the selected printer after the print button has been operated (S160 in FIG. 4), the application 30 provides the OS 32 with a scan instruction to perform the scan process in the low latency mode (S104 in FIG. 2, or S162 in FIG. 4). Thus, it is possible for each mobile phone 10 and 50 to make an appropriate selection between reducing power consumption and promptly establishing BLE communication, based on where the corresponding user of each mobile phone 10 and 50 is.

Hereinabove, the illustrative embodiments according to aspects of the present disclosure have been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

In each of the aforementioned illustrative embodiments, each of the mobile phones 10 and 50 is configured such that the scan mode therefor is selectively set to either of the low latency mode and the low power mode, depending on a corresponding one of the conditions such as the mode specifying information on the table stored in the corresponding data storage area 34 or 74, the battery charge remaining in each mobile phone 10 and 50, and the positional information of each mobile phone 10 and 50. Nonetheless, the scan mode for each mobile phone 10 and 50 may be selectively set to either of the low latency mode and the low power mode, depending on at least two of the conditions as exemplified in the aforementioned illustrative embodiments. Specifically, for instance, the scan mode for each mobile phone 10 and 50 may be set to the low latency mode when the user of each mobile phone 10 and 50 is out of the user's office. Meanwhile, when the user of each mobile phone 10 and 50 is in the user's office, it may be determined whether the amount of battery charge remaining in each mobile phone 10 and 50 is equal to or more than the corresponding threshold. In this case, when the battery charge remaining amount is equal to or more than the threshold, the scan mode may be set to the low latency mode. Meanwhile, when the battery charge remaining amount is less than the threshold, the scan mode may be set to the low power mode.

Further, only in the second illustrative embodiment of the aforementioned illustrative embodiments, an example is shown in which each printer 80 is configured to change the transmission interval for regularly transmitting an advertising packet. However, in any illustrative embodiment other than the second illustrative embodiment, each printer 80 may be configured to change the transmission interval for regularly transmitting an advertising packet.

Further, in the aforementioned illustrative embodiments, the two modes, i.e., the low latency mode and the low power mode are employed as the scan mode for each mobile phone 10 and 50. Nonetheless, one or more modes other than the above-exemplified two modes may be employed as the scan mode. Specifically, for instance, an intermediate mode between the low latency mode and the low power mode may be employed. In the intermediate mode, each mobile phone 10 and 50 may be brought into the scan state at intervals of a period shorter than the period for the low power mode and longer than the period for the low latency mode. More specifically, for instance, in the intermediate mode, each mobile phone 10 and 50 may periodically and alternately repeat the scan state lasting for about 2000 ms and the non-scan state lasting for about 3000 ms. When the low latency mode and the intermediate mode are employed, in the situation where it is preferable to reduce power consumption, each application 30 and 70 may provide the corresponding OS 32 or 72 with a scan instruction to perform the scan process in the intermediate mode. Meanwhile, in the situation where it is preferable to promptly establish BLE communication, each application 30 and 70 may provide the corresponding OS 32 or 72 with a scan instruction to perform the scan process in the low latency mode. Further, when the low power mode and the intermediate mode are employed, in the situation where it is preferable to reduce power consumption, each application 30 and 70 may provide the corresponding OS 32 or 72 with a scan instruction to perform the scan process in the low power mode. Meanwhile, in the situation where it is preferable to promptly establish BLE communication, each application 30 and 70 may provide the corresponding OS 32 or 72 with a scan instruction to perform the scan process in the intermediate mode. It is noted that the three modes, i.e., the low power mode, the low latency mode, and the intermediate mode may be employed.

Further, in the aforementioned second illustrative embodiment, each of the mobile phones 10 and 50 is configured such that the corresponding application 30 or 70 selectively provides one of a scan instruction to perform the scan process in the low power mode and a scan instruction to perform the scan process in the low latency mode, to the corresponding OS 32 or 72 depending on the model of each mobile phone 10 and 50. Nonetheless, each mobile phone 10 and 50 may be configured such that the corresponding application 30 or 70 selectively provides one of a scan instruction to perform the scan process in the low power mode and a scan instruction to perform the scan process in the low latency mode, to the corresponding OS 32 or 72 depending on a type of the corresponding OS 32 or 72. Specifically, for instance, the mobile phone 10 using the OS 32 may be configured such that the application 30 provides the OS 32 with a scan instruction to perform the scan process in the low power mode. Meanwhile, the mobile phone 50, which uses the OS 72 of a type different from the type of the OS 32, may be configured such that the application 70 provides the OS 72 with a scan instruction to perform the scan process in the low latency mode.

Further, in the aforementioned illustrative embodiments, the printers 80a, 80b, and 80c are exemplified as communication devices connectable with each of the mobile phones 10 and 50 via BLE communication. Nonetheless, various devices including but not limited to image processing devices such as image scanners may be exemplified as communication devices connectable with each mobile phone 10 and 50 via BLE communication.

Further, in the aforementioned illustrative embodiments, print image data is transmitted along with a print instruction via the successfully established BLE communication. Nonetheless, various kinds of information including but not limited to print image data may be transmitted via BLE communication.

Further, in the aforementioned illustrative embodiments, the BLE communication is exemplified as available communication between the mobile phones 10 and 50 and the printers 80a, 80b, and 80c. Nonetheless, any other communication method may be employed therebetween as long as the used communication method is compliant with a communication protocol using signals transmitted by communication devices such as the printers 80a, 80b, and 80c.

In the aforementioned illustrative embodiments, as exemplified with reference to FIGS. 2 to 5 and 7 to 11, the processes to be implemented on each mobile phone 10 and 50 are performed by the corresponding CPU 12 or 52. Nonetheless, the processes to be implemented on each mobile phone 10 and 50 may be performed by another logic integrated circuit such as an ASIC. In another instance, at least two of CPUs and other logic integrated circuits such as ASICs may perform the processes in cooperation with each other.

Associations between elements exemplified in the aforementioned illustrative embodiments and elements according to aspects of the present disclosure will be exemplified below. Each of the mobile phones 10 and 50 may be an example of a "communication terminal" according to aspects of the present disclosure. The printers 80a, 80b, and 80c may be included in examples of "one or more communication devices" according to aspects of the present disclosure. Each of the CPU 12 and 52 may be an example of a "processor" according to aspects of the present disclosure. Each of the memory 14 and 54 may be an example of a "non-transitory computer-readable medium" according to aspects of the present disclosure. Further, each of the memory 14 and 54 may be an example of a "memory" according to aspects of the present disclosure. Each of the OSs 32 and 72 may be an example of an "OS" contained in "computer-readable instructions" according to aspects of the present disclosure. Each of the applications 30 and 70 may be an example of an "application" contained in the "computer-readable instructions" according to aspects of the present disclosure. Each of the short-range wireless communication I/Fs 24 and 64 may be an example of a "communication interface" according to aspects of the present disclosure. Each of the displays 16 and 56 may be an example of a "display" according to aspects of the present disclosure. Each of the input I/Fs 18 and 58 may be an example of a "user interface" according to aspects of the present disclosure. Each of the GPS signal receivers 20 and 60 may be an example of a "positional information acquirer" according to aspects of the present disclosure. The low latency mode may be an example of a "first mode" according to aspects of the present disclosure. The low power mode may be an example of a "second mode" according to aspects of the present disclosure. The short period mode may be an example of a "third mode" according to aspects of the present disclosure. The long period mode may be an example of a "fourth mode" according to aspects of the present disclosure.

What is claimed is:

1. A non-transitory computer-readable medium storing computer- readable instructions that are executable by a processor coupled with a communication terminal, the communication terminal comprising a communication interface and a display and storing an operating system (OS) configured to, when executed by the processor, cause the communication terminal to perform a signal receiving process to receive a communication signal from one or more communication devices via the communication interface, each communication device being configured to periodically transmit the communication signal, the communication signal including information, the computer-readable instructions comprising an application configured to, when executed in a foreground by the processor, cause the communication terminal to:

when a first condition is satisfied, provide the OS with a first instruction to perform the signal receiving process in a first mode where the OS is alternately switched between a signal-receivable state and non-receivable state at a first cycle period, the signal-receivable state being a state in which the OS is allowed to receive the communication signal;

when a second condition different from the first condition is satisfied, provide the OS with a second instruction to perform the signal receiving process in a second mode where the OS is alternately switched between the signal-receivable state and the non-receivable state at a second cycle period, the second cycle period being longer than the first cycle period and the non-receivable state in the second mode is longer than the signal-receivable state in the second mode;

after the OS receives one of the first instruction and the second instruction, the OS performs the signal receiving process in the first mode or the second mode, wherein when the information from at least one communication device is received, the communication terminal perform at least one of:

displaying, on the display, the at least one communication device devices communicable by using the received information; and providing the OS with a communication instruction to perform communication with a specified communication device by using a corresponding piece of the received information.

2. The non-transitory computer-readable medium according to claim 1, wherein the communication terminal further comprises a user interface, and wherein the application is further configured to, when executed in the foreground by the processor, cause the communication terminal to:

when accepting, via the user interface, a search instruction to search for the one or more communication devices communicable with the communication terminal via the communication interface, determine that the second condition is satisfied, and provide the second instruction to the OS; and when accepting, via the user interface, the communication instruction to communicate with the specified communication device communicable with the communication terminal via the communication interface, determine that the first condition is satisfied, and provide the first instruction to the OS.

3. The non-transitory computer-readable medium according to claim 1, wherein the communication terminal further comprises a memory storing mode specifying information in association with each of models of a plurality of communication terminals, the plurality of communication terminals including the communication terminal and at least one other communication terminal, the mode specifying information specifying one of the first mode and the second mode for each of the models of the plurality of communication terminals, and wherein the application is further configured to, when executed in the foreground by the processor, cause the communication terminal to:

when the mode specifying information stored in the memory specifies the first mode for the model of the communication terminal that is executing the application among the plurality of communication terminals, determine that the first condition is satisfied, and provide the first instruction to the OS; and when the mode specifying information stored in the memory specifies the second mode for the model of the communication terminal that is executing the application among the plurality of communication terminals, determine that the second condition is satisfied, and provide the second instruction to the OS.

4. The non-transitory computer-readable medium according to claim 1, wherein the application is further configured to, when executed in the foreground by the processor, cause the communication terminal to:

determine which condition is satisfied of the first condition and the second condition, based on information regarding a battery of the communication terminal.

5. The non-transitory computer-readable medium according to claim 4, wherein the application is further configured to, when executed in the foreground by the processor, cause the communication terminal to:

when the information regarding the battery of the communication terminal represents that an amount of battery charge remaining in the communication terminal is equal to or more than a threshold, determine that the first condition is satisfied, and provide the first instruction to the OS; and when the information regarding the battery of the communication terminal represents that the amount of battery charge remaining in the communication terminal is less than the threshold, determine that the second condition is satisfied, and provide the second instruction to the OS.

6. The non-transitory computer-readable medium according to claim 4, wherein the application is further configured to, when executed in the foreground by the processor, cause the communication terminal to:

when the information regarding the battery of the communication terminal represents that the communication terminal is being charged, determine that the first condition is satisfied, and provide the first instruction to the OS; and when the information regarding the battery of the communication terminal represents that the communication terminal is not being charged, determine that the second condition is satisfied, and provide the second instruction to the OS.

7. The non-transitory computer-readable medium according to claim 1, wherein the communication terminal further comprises a positional information acquirer configured to acquire positional information representing a position of the communication terminal, and wherein the application is further configured to, when executed in the foreground by the processor, cause the communication terminal to:

when the acquired positional information represents that the communication terminal is positioned within a particular range, determine that the first condition is satisfied, and provide the first instruction to the OS; and when the acquired positional information represents that the communication terminal is not positioned within the particular range, determine that the second condition is satisfied, and provide the second instruction to the OS.

8. The non-transitory computer-readable medium according to claim 1,
wherein the communication interface is configured to perform near field communication with the one or more communication devices, using a Bluetooth protocol,
wherein each communication device is further configured to periodically transmit an advertising packet as the communication signal, and
wherein the application is further configured to, when executed in the foreground by the processor, cause the communication terminal to:
when the first condition is satisfied, provide the OS with the first instruction to perform, as the signal receiving process, a scan process in the first mode where the advertising packet is received at first intervals of the first period;
when the second condition is satisfied, provide the OS with the second instruction to perform, as the signal receiving process, the scan process in the second mode where the advertising packet is received at second intervals of the second period longer than the first period;
each time the communication terminal receives the advertising packet from one of the one or more communication devices while performing the scan process in accordance with an instruction, received via the OS, of the first instruction and the second instruction, receive the information of the one of the one or more communication devices; and
perform at least one of:
displaying, on the display, the one or more communication devices communicable by using the received information; and
providing the OS with the communication instruction to perform communication with the specified communication device by using the corresponding piece of the received information.

9. A non-transitory computer-readable medium storing computer-readable instructions that are executable by a processor coupled with a communication terminal, the communication terminal comprising a communication interface and a display and storing an operating system (OS) configured to, when executed by the processor, cause the communication terminal to perform a signal receiving process to receive a communication signal from one or more communication devices via the communication interface, each communication device being configured to periodically transmit the communication signal, the computer-readable instructions comprising an application configured to, when executed in a foreground by the processor, cause the communication terminal to:
when a first condition is satisfied, provide the OS with a first instruction to perform the signal receiving process in a first mode where the communication signal is received at first intervals of a first period;
when a second condition different from the first condition is satisfied, provide the OS with a second instruction to perform the signal receiving process in a second mode where the communication signal is received at second intervals of a second period longer than the first period;
each time the OS, having received one of the first instruction and the second instruction, causes the communication terminal to receive the communication signal from one of the one or more communication devices in the signal receiving process based on the received one of the first instruction and the second instruction, receive information of the one of the one or more communication devices, the information being contained in the received communication signal; and
perform at least one of:
displaying, on the display, the one or more communication devices communicable by using the received information; and
providing the OS with a communication instruction to perform communication with a specified one of the one or more communication devices by using a corresponding piece of the received information,
wherein each communication device is further configured to transmit the communication signal in one of:
a third mode where the communication signal is transmitted at intervals of a third period; and
a fourth mode where the communication signal is transmitted at intervals of a fourth period longer than the third period, and
wherein the application is further configured to, when executed in the foreground by the processor, cause the communication terminal to:
when the communication terminal is set to perform the signal receiving process in the first mode, transmit a third instruction to transmit the communication signal in the third mode, to the specified communication device via the OS; and
when the communication terminal is set to perform the signal receiving process in the second mode, transmit a fourth instruction to transmit the communication signal in the fourth mode, to the specified communication device via the OS.

10. A communication terminal comprising:
a communication interface;
a display;
a processor; and
a memory storing:
an operating system (OS) configured to, when executed by the processor, cause the communication terminal to perform a signal receiving process to receive a communication signal from one or more communication devices via the communication interface, the communication signal including information, each communication device being configured to periodically transmit the communication signal; and
computer-readable instructions comprising an application configured to, when executed in a foreground by the processor, cause the communication terminal to:
when a first condition is satisfied, provide the OS with a first instruction to perform the signal receiving process in a first mode where the OS is alternately switched between a signal-receivable state and non-receivable state at a first cycle period, the signal-receivable state being a state in which the OS is allowed to receive the communication signal;
when a second condition different from the first condition is satisfied, provide the OS with a second instruction to perform the signal receiving process in a second mode where the OS is alternately switched between the signal-receivable state and the non-receivable state at a second cycle period, the second cycle period being longer than the first cycle period and the non-receivable state in the second mode is longer than the signal-receivable state in the second mode;

after the OS receives one of the first instruction and the second instruction, the OS performs the signal receiving process in the first mode or the second mode, wherein when the information from at least one communication device is received, the communication terminal perform at least one of:
- displaying, on the display, the at least one communication device communicable by using the received information; and
- providing the OS with a communication instruction to perform communication with a specified communication device by using a corresponding piece of the received information.

* * * * *